United States Patent [19]
Fatica et al.

[11] Patent Number: 6,033,786
[45] Date of Patent: Mar. 7, 2000

[54] METALLIZED FILMS

[75] Inventors: Michael G. Fatica; Nand K. Singh, both of Newark, Del.

[73] Assignee: Applied Extrusion Technologies, Inc., Peabody, Mass.

[21] Appl. No.: 08/721,146

[22] Filed: Sep. 26, 1996

Related U.S. Application Data

[63] Continuation-in-part of application No. 08/534,411, Sep. 27, 1995, abandoned.

[51] Int. Cl.[7] .............................. B32B 15/08; B32B 27/32
[52] U.S. Cl. ........................... 428/461; 428/409; 428/516
[58] Field of Search ................................ 428/35.8, 35.9, 428/461, 516, 409

[56] References Cited

U.S. PATENT DOCUMENTS

| | | | |
|---|---|---|---|
| 4,230,767 | 10/1980 | Isaka et al. | 428/349 |
| 4,343,852 | 8/1982 | Isaka et al. | 428/216 |
| 4,487,871 | 12/1984 | Ishibashi et al. | 524/100 |
| 4,888,237 | 12/1989 | Balloni et al. | 428/347 |
| 4,975,315 | 12/1990 | Bothe et al. | 428/216 |
| 5,277,970 | 1/1994 | Schuhmann et al. | 428/323 |
| 5,281,483 | 1/1994 | Hwo | 428/461 |
| 5,302,427 | 4/1994 | Murschall et al. | 428/34.2 |
| 5,326,625 | 7/1994 | Schuhmann et al. | 428/215 |
| 5,366,796 | 11/1994 | Murschall et al. | 428/34.2 |
| 5,436,041 | 7/1995 | Murschall et al. | 428/216 |
| 5,478,643 | 12/1995 | Peiffer et al. | 428/332 |
| 5,489,454 | 2/1996 | Peiffer et al. | 428/34.9 |
| 5,492,757 | 2/1996 | Schuhmann et al. | 428/329 |
| 5,518,792 | 5/1996 | Masuda et al. | 428/36.6 |

*Primary Examiner*—Vivian Chen
*Assistant Examiner*—D. Lawrence Tarazano
*Attorney, Agent, or Firm*—Caesar, Rivise, 'Bernstein, Cohen & Pokotilow, Ltd.

[57] ABSTRACT

A biaxially oriented, heat-set, multilayer film includes a core layer, a bonding layer having a surface adhered to the core layer and a flame treated surface opposite the surface adhered to the core layer. A metal coating for providing oxygen and moisture barrier properties deposited on the flame treated surface and a protective plastic film adhered to said metal coating. The core layer and bonding layer either are free of void-creating additives or include only a quantity of such additives that does not create a matte surface adversely affecting the barrier properties of the metal coating. The bonding layer comprising a mixture including 40 to 100% by weight of propylene/butene-1 copolymer containing up to about 14% by weight of butene-1 (PBC), 0 to 60% of an isotactic polypropylene (PP) and 0 to 50% of a copolymer of ethylene and propylene wherein propylene is the predominant component by weight (EPC).

10 Claims, No Drawings

METALLIZED FILMS

This application is a continuation-in-part of U.S. application Ser. No. 08/534,411 filed Sep. 27, 1995 now abandoned.

FIELD OF THE INVENTION

The present invention relates to metallized polymeric films that are particularly useful in the packaging art, where excellent oxygen and moisture barrier properties are desired or required.

BACKGROUND INFORMATION

Polyolefin films have become a dominant factor in the packaging industry in recent years thanks to a spectrum of favorable properties. However, these materials have several drawbacks that have hampered, to a degree, the realization of their full potential as packaging materials. One such drawback is their lack of good resistance to the transmission of oxygen and moisture vapor.

A very desirable approach to improving the oxygen and moisture vapor transmission of polymer films is the application of a barrier coating, typically a metal coating, to the surface of the film, to thereby form a metallized film. It is to such films that the present invention relates.

TORAY INDUSTRIES, INC. (Japanese Patent Publication No. 61-225049) teaches preparation of metallized polypropylene films by extruding a mixture of polypropylene and a hydrocarbon resin and treating the surface thereof with corona discharge in a nitrogen/$CO_2$ atmosphere. This treatment inserts amino and/or amido groups into the surface of the film to a depth of about 100 Å. The thus treated film surface is then metallized. To demonstrate the necessity of the nitrogen/$CO_2$ treatment, Comparative Example 3 of this reference shows poor barrier properties being realized when the corona treatment is carried out in the presence of air rather than in the specified nitrogen/$CO_2$ atmosphere.

Copending U.S. patent application Ser. No. 08/076,894, filed Jun. 15, 1993, also teaches the preparation of polyolefin films suitable for application of a metal or other type of barrier coating. These films are comprised of a polyolefin, preferably polypropylene, film having a barrier coating receiving layer on one surface thereof. This barrier coating receiving layer is comprised of a polyolefin containing about 1 to 30% by weight of a hydrocarbon resin. The films of the reference application are characterized by excellent adhesion of barrier coatings and excellent barrier properties after application of the barrier coating.

U.S. Pat. No. 4,343,852, issued to Isaka et al., discloses a heat shrink film including a surface layer that optionally can be provided with a metal coating after treatment of the surface layer with a corona discharge. As disclosed, the surface layer for receiving the metal coating can include a variety of different combinations of copolymers, including copolymers of butene-1 and propylene. Such a heat shrink film is not suitable for fabricating extrusion laminated metallized film having good barrier properties, due to the intentionally low dimensional stability towards heat. Moreover, in Examples 2 (column 14) and 3 (column 16), which are the only two examples specifying that the film can be metallized, the film is specified as being corona treated, and the butene-1 content in the propylene/butene-1 copolymers is 20% and 25%, respectively.

U.S. Pat. No. 4,888,237, issued to Balloni et al., discloses a metallized film in which the surface that is provided with a metallized coating is the surface of a crystalline polyolefin layer that is flame treated prior to being metallized. This patent teaches or suggests that the effect of corona treatment or flame treatment in preparing a surface for receiving a metallized coating is not necessarily predictable, and depends, at least in part, on the composition of the surface being treated. Balloni et al. do not suggest or teach any metallized film having a metal coated layer including a butene-1/propylene copolymer within the percentage range of the present invention, and actually, teaches away from such a range; nor do Balloni, et al. suggest or teach that the flame treatment of such a layer would be a desirable treatment of the layer prior to metallization.

U.S. Pat. No. 5,366,796, issued to Murschall, et al., discloses a biaxially oriented multi-layer film that can include a layer having 20% to 80% of a copolymer of propylene and butylene. The patentees teach that the aforementioned layer can optionally be corona or flame treated to enhance the printability of the surface. Although the patentees state that the film is suitable for the production of laminates, including laminates with metallized plastic films, there is no disclosure or suggestion of providing a metal coating on the film as in the present invention. In fact, additives disclosed as being includable in the various layers can adversely effect the bonding of a metal coating to such layers.

U.S. Pat. No. 5,436,041, issued to Murschall et al., discloses a multi-layer film that is sealable on both sides and includes a surface with high surface gloss having good optical properties and good printability. This patent suggests either flame treatment or corona treatment of a layer to be covered with polydialkylsiloxane, but in one preferred form of the invention teaches corona treatment only. Like the Murschall et al. '796 patent, the Murschall et al. '041 patent discloses that the film is suitable for the production of laminates, including laminates with metallized plastic films. However, there is no disclosure or suggestion of providing a metal coating on the film as in the present invention. In fact, additives disclosed as being includable in the various layers can adversely effect the bonding of a metal coating to such layers.

U.S. Pat. No. 4,487,871, issued to Ishibashi, et al., discloses a polyolefin resin composition including a propylenebutene-1 copolymer having a propylene component in a weight percent of at least 70%. This copolymer is present in the range of 96%–80% by weight, and the composition additionally includes 4% to 20% by weight of a high density polyethylene homopolymer or copolymers of ethylene as a main component with other alpha-olefins. The '871 patent discloses only corona treating a surface of the composition to be provided with a metal coating and does not teach or suggest that any enhanced benefits could be obtained by flame treating that surface.

U.S. Pat. No. 5,492,757, issued to Schuhmann et al., discloses a composite film comprised of a base layer, an interlayer and at least one surface layer applied to the interlayer. The base layer can include fillers, including void-creating pigments such as calcium carbonate. The outer surface layer is one or more olefin polymers selected from a long list including polypropylene and copolymers of propylene and butylene. The use of copolymers of propylene and butylene is not exemplified nor is there any teaching of why or how one would apply such copolymers in a composition to enhance metallization. In fact, although the '757 patent suggests laminating the film to other substrates, there is no suggestion of even forming a metallized film of the type forming the subject matter of this invention.

U.S. Pat. No. 4,975,315, issued to Bothe, et al., discloses a metallized film which is corona treated prior to metallizing. There is no suggestion that flame treatment is acceptable, let alone that it would provide superior bond strength between the plastic film and the metal coating. The composition of the metal coating receiving layer is described as including, inter alia, "a propylene/ethylene copolymer having an ethylene content of about 3% by weight or less or of a propylene/ethylene and/or butene-1 copolymer having an ethylene and butene content of about 5% by weight or less in total." (emphasis added). The reference to "a propylene/ethylene and/or butene copolymer having an ethylene and butene content of about 5% by weight or less in total" (emphasis added) is, at best vague, and appears to have been intended to describe a terpolymer of propylene/ethylene/butene-1, as opposed to a propylene/ethylene copolymer and/or a propylene/butene-1 copolymer. Otherwise, the specific reference to the metal coating receiving layer including a propylene/ethylene copolymer having an ethylene content of about 3% would be inconsistent with a subsequent interpretation that the layer could include a propylene ethylene copolymer wherein the ethylene content is of about 5% by weight or less.

U.S. Pat. No. 5,478,643, issued to Peiffer, et al., discloses a matte transfer metallization film for receiving a metal layer, which subsequently is transferred to the final product to be metallized. This patent does not teach a metallized film structure wherein a metal coating is tenaciously and permanently attached as in the present invention.

U.S. Pat. No. 5,489,454, issued to Peiffer, et al., discloses a shrinkable multilayer film having a matte surface, which can be metallized after either corona or flame treatment. The matte surface can include a copolymer of propylene and butylene.

U.S. Pat. No. 5,302,427, issued to Murschall, et al., discloses a multilayer film including a sealing layer having a propylene/butylene copolymer present in a weight percent of 50% of the sealing layer, and wherein the butylene component of the copolymer is 33.2%, by weight of the copolymer. Although the patentees state that the film is suitable for the production of laminates, including laminates with metallized plastic films, there is no disclosure or suggestion of providing a metal coating on the film as in the present invention.

U.S. Pat. No. 4,343,852, issued to Isaka, et al., discloses a heat shrinkable, multilayer product including a surface layer having 50% or more by weight of a propylene/butene-1 copolymer, wherein the butene component is at least 20% of the copolymer.

U.S. Pat. No. 5,326,625, issued to Schuhmann, et al., discloses a sealable, opaque, biaxially oriented film including a core layer containing calcium carbonate, an intermediate layer, and a top layer. The top layer can include a copolymer of propylene and butylene, either alone or in combination with other copolymers or terpolymers, and this top layer can be corona or flame treated, and, if desired, provided with a metal coating.

U.S. Pat. No. 5,277,970, issued to Schuhmann, et al., discloses a sealable, opaque, biaxially oriented white film including a core layer containing calcium carbonate, an intermediate layer, and a top layer that can be surface treated, by means not specifically disclosed, to improve its metallizability.

U.S. Pat. No. 5,281,483, issued to Hwo, discloses metallized films employing a blend of no more than about 10% by weight of low molecular weight, isotactic poly-1-butene and at least about 90% by weight of a propylene polymer. Thus in the Hwo construction the butene is present as a blend with polypropylene, not as a copolymer.

BRIEF STATEMENT OF THE INVENTION

In accordance with this invention it has been found that films useful for application of a barrier coating to endow them with good oxygen and moisture barrier properties, and therefore rendering them highly suitable for packaging materials, such as for packaging materials for food products, are biaxially oriented, heat-set, multilayer films including a polyefin core layer having at least one bonding layer with a surface adhered to said core layer and a flame treated surface opposite the surface adhered to said core layer, a metal coating for providing oxygen and moisture barrier properties deposited on said flame treated surface and a protective plastic film layer adhered to said metal coating, said core layer and bonding layer either being free of void-creating additives or including only a quantity of such additives that does not create a matte surface adversely affecting the barrier properties of said metal coating, said bonding layer comprising a mixture including 40 to 100% by weight of propylene/butene-1 copolymer containing up to about 14% by weight of butene-1 (PBC), 0 to 60% of an isotactic polypropylene (PP) and 0 to 50% of a copolymer of ethylene and propylene wherein propylene is the predominant component by weight (EPC).

Reference throughout this application to the multilayer films of this invention being "heat set" identifies films which, in the plastic film art, are not considered to be heat shrinkable.

Reference throughout this application to a "metal coating" being part of the multilayer films of this invention is limited (1) to a metal coating that is tenaciously adhered to the films (i.e., it is not transferable from the films of this invention to another substrate), and (2) to a metal coating that is applied by a deposition process such as sputtering, vacuum vapor deposition, plasma treatment and electroplating, and not as a metal layer formed separately from the multilayer films of this invention, either alone or laminated to another carrier layer.

The copolymers of propylene and butene-1 useable in this invention are those containing about 1 to 14% butene-1 and even more preferable are those containing about 4 to 14% butene-1.

In a preferred embodiment of the invention, the bonding layer of the film is about 50 to 100% by weight of a propylene/butene-1 copolymer containing up to about 14% by weight butene-1, 0 to 50% by weight of isotactic polypropylene and 0 to 50% of a copolymer of ethylene and propylene wherein propylene is the predominant component by weight.

In a particularly preferred embodiment, the bonding layer of the film is about 50 to 90% by weight of a propylene/butene-1 copolymer containing up to about 14% by weight butene-1, 9 to 49% by weight of isotactic polypropylene and 1 to 20% of a copolymer of ethylene and propylene wherein propylene is the predominant component by weight.

Most preferably the core layer is polypropylene. Throughout this specification, unless otherwise indicated, the term "polypropylene" means a crystalline (isotactic) homopolymer of propylene or a copolymer of propylene with another olefin in an amount insufficient to change the crystalline nature of the polypropylene significantly or to change the properties that make polypropylene a desirable packaging material. Typically, this olefin will be ethylene in an amount not exceeding about 1% by weight.

The term "PBC mixture" includes either PBC alone or a mixture of PBC with one or more of the other polyolefins that can be used in combination therewith according to this invention.

DETAILED DESCRIPTION OF THE INVENTION

This invention is a biaxially oriented, heat-set, multilayer film including a polyolefin core layer having on one or both of its surfaces, a bonding layer with a surface adhered to said core layer and a flame treated surface opposite the surface adhered to said core layer. A metal coating for providing oxygen and moisture barrier properties is provided on said flame treated surface and a protective plastic film layer is adhered to said metal coating. The core layer and bonding layer(s) either are free of void-creating additives or include only a quantity of such additives that does not create a matte surface adversely affecting the barrier properties of the metal coating. The bonding layer comprises a mixture including 40 to 100% by weight of propylene/butene-1 copolymer containing up to about 14% by weight of butene-1 (PBC), 0 to 60% of an isotactic polypropylene (PP) and 0 to 50% of a copolymer of ethylene and propylene wherein propylene is the predominant component by weight (EPC).

The copolymer of ethylene and propylene useable in this invention is predominantly propylene, and most preferably is a crystalline random copolymer having about 1 to 6% ethylene by weight, more preferably 1 to 4% ethylene by weight, and most preferably 2% ethylene by weight, with the balance constituting the propylene.

Most preferably, the core layer of the multilayer film of this invention is polypropylene, specifically isotactic (crystalline) polypropylene. As stated above, the term "polypropylene" includes both propylene homopolymers and copolymers of propylene with ethylene or an α-olefin. The preferred polypropylene for use in the core layer is isotactic propylene homopolymer.

The bonding layer mixture employed in the multilayer films of this invention provides an excellent receiving layer for a barrier coating, such as a metal coating for effecting an improvement in the film's oxygen or moisture vapor transmission properties.

The protective plastic film preferably is a thin polypropylene film layer that can be clear and/or provided with printed indicia thereon. The plastic film preferably is adhered to the metal coating through a polyethylene adhesive layer extruded onto said metal coating.

As stated above, the multilayer film of this invention can have a PBC or PBC blend bonding layer on one or both of its surfaces. If the PBC blend bonding layer is present on only one surface of the multilayer film structure, the other surface can be uncoated or it can carry another functional or multifunctional layer such as, e.g., a heat seal layer, a slip layer or a printable layer or a layer that combines two or more such functions. Further, the additional layer can be a layer suitable for lamination with yet another layer or material.

In one preferred form of the invention, a bonding layer is provided on only one side of the core layer, and the other side of the core layer includes a heat seal layer; preferably an ethylene/propylene/butene-1 terpolymer layer.

As stated above, the preferred polyolefin for use in the core layer of the composite film embodiment of the invention is an isotactic homopolymer of propylene. Suitable polypropylenes are the commercially available isotactic polypropylenes having a melt flow rate between about 2 and 10 dg/min and a DSC melting point of about 160 to 166° C. One polypropylene that can be used is the highly isotactic homopolymer having a melt flow rate of about 3.5 dg/min. available from Aristech Chemical Corporation, Pittsburgh, Pa. Suitable polypropylenes are also available from Montell, Inc. Wilmington, Del. and from Exxon Chemical Company, Baytown, Tex.

The PBC's employed in the films of the invention are available from Shell Chemical Company, Houston, Tex. They are sold under the trade name Cefor™ Resins.

In the bonding layer of this invention, the polypropylene employed in the PBC blend is an isotactic propylene homopolymer. The polypropylene employed in the PBC blend need not be the same as that employed in the core. However, it is preferable that it be the same.

If another functional layer is included on the side of the core layer opposite the bonding layer containing the PBC, the materials employed in that other functional layer will be dictated by the function intended for that layer. Thus, the additional layer need not contain any polypropylene at all. If this layer is intended to be a heat seal layer, it will be a layer of, e.g., polyvinyl or polyvinylidene chloride or a polyolefin of a lower melting point than that of the polypropylene employed as the core layer. The lower melting polyolefin can be, e.g., an ethylene/propylene copolymer having an ethylene content sufficient to lower the melting point to a temperature such that the film can be heat sealed without melting or deorienting the core. As stated above, a terpolymer of ethylene, propylene and butene-1 is a preferred polymer for a sealing layer. If the layer is to be a slip layer, it can be composed of the same polymer as is used in the core, but into which the appropriate additives have been incorporated.

Conventional additives, in conventional amounts, can be included in the multilayer films of this invention, provided that no additive should be included that can negatively affect the performance of the layer into which it is incorporated or that can migrate into another layer and negatively affect the performance of that layer in carrying out its intended function. Suitable conventional additives include antioxidants, pigments, orientation stress modifiers, flame retardants, antistatic agents, antifoggants and slip agents.

Specifically with respect to the PBC blend bonding layer, which is the receiving layer for the metal coating, it is advisable to use little or none of additives such as slip agents or antistats, which must migrate to the surface of the bonding layer in order to carry out their antistatic or slip functions. The inclusion of such additives on the surface of the bonding layer can interfere with establishing an effective metal coating for enhancing the oxygen and moisture barrier properties of the film.

It is also preferred to avoid the use of pigments such as calcium carbonate, which promote the formation of voids in the polymer matrix upon drawing of the film. Pigments of this type are frequently employed to produce opaque films having a matte surface. However, employing such pigments in either the core layer or bonding layer of the metallized films of this invention leads to poor surface conditions for receiving a uniform metal coating and consequently creates poor barrier properties, as compared to the barrier properties in the multilayer, metallized films of this invention, which either are free of void-creating pigments, or include only a quantity of such pigments that does not create a matte surface adversely affecting the barrier properties of the metal coating. Typically, if calcium carbonate or another pigment is used in the core layer or bonding layer it should be less than 2% by weight of such layer.

Hydrocarbon resins are one class of additives that are permissible in the PBC blend layer(s), and are frequently used as extrusion aids and orientation stress modifiers. The term "hydrocarbon resin" refers to a class of relatively low molecular weight, low softening point resins based on any of a number of hydrocarbon starting materials. Hydrocarbon resins include resins derived from terpenes, aliphatic or aromatic petroleum components and coal tar hydrocarbons.

The multilayer, metallized films of this invention typically have a total thickness in the range of about 0.25 to about 1.0 mil. The thickness of the core layer preferably is about 0.23 to 0.8 mil and that of the PBC blend bonding layer(s) is about 0.01 to 0.1 mil. If a second functional layer is present (e.g., a sealing layer on the side of the core layer opposite the PBC blend bonding layer), its thickness likewise will be about 0.01 to 0.1 mil. Stated otherwise, the thickness of a functional layer is between about 1.25 and 43.5% the thickness of the core layer.

The multilayer films of this invention can be prepared by methods conventionally employed in the film making art. Specifically, these films, prior to metallization, can be formed by a coextrusion, extrusion coating or lamination process. The preferred method is coextrusion wherein the various layers (e.g., core layer, PBC blend bonding layer and optionally another functional layer on the side of the core layer opposite the PBC blend bonding layer) are extruded simultaneously through a multi-layer, or multi-slot die and immediately brought together in the molten state so that they are permanently bonded upon solidifying.

The preferred films in accordance with this invention are then biaxially drawn to effect molecular orientation thereof and improve their properties, specifically, their tensile strength and their modulus (stiffness), and the film is then heat-set. This biaxial drawing operation can be effected by conventional techniques i.e., bubble or tenter.

In accordance with this invention, the PBC blend bonding layer including the barrier metal coating thereon is, prior to deposition of said metal coating, subjected to an oxidizing flame treatment operation to provide a surface having enhanced adherence to said barrier metal coating. In fact, applicants have discovered that flame treating the metal-coating receiving surface of the PBC blend bonding layer provides significantly better adhesion for the deposited metal coating than corona treating said surface.

The flame treatment operation is applied at a level sufficient to increase the surface tension of the film to 50 or more dynes to achieve a high bond strength between the metal coating and film in accordance with the most preferred form of this invention. However, for some applications wherein a moderate bond strength is acceptable, a lower surface tension, e.g., in the range of about 38 to 45 dynes, is adequate.

As indicated earlier herein, the barrier coating material employed in the films of this invention is a metal coating, with the preferred materials being aluminum, aluminum oxide, zinc, copper and copper alloys such as bronze, as well as gold and silver. Mixtures of any of these materials can also be employed. Aluminum is the most preferred barrier coating material.

The metal coatings can be applied by a variety of known deposition techniques, including sputtering, vacuum vapor deposition, plasma treatment and electroplating. Of these, vacuum vapor deposition is preferred and is most commonly employed.

The multilayer, metallized films of the invention are characterized by a high resistance to the passage of oxygen and moisture vapor therethrough without regard to the thickness of the film. This characteristic is of particular value in the use of the film for commercial packaging applications for such items as candy, snack foods and other food products that lose freshness rapidly when exposed to air and moisture vapor. In addition, these films are characterized by extremely good adhesion of the metal coating thereto.

The metallized films of this invention typically exhibit an oxygen transmission rate (OTR) less than about 4 $cm^3/100$ $in^2$/atm/day. Frequently, the OTR is less than about 2 $cm^3/100$ $in^2$/atm/day. The OTR is measured according to ASTM D3985-81 at room temperature and 100% oxygen, dry.

The water vapor transmission rate (WVTR) of the barrier coated films of the invention is typically less than about 0.03 gm/100 $in^2$/day and usually less than about 0.01 g/100 $in^2$/day at 85° F. and 100% RH. The WVTR is measured according to ASTM F1249-90 at 100° F. or 85° F. and 100% RH with a correction factor of 0.9 or 0.8 applied to simulate, respectively, 100° F. and 90% RH or 85° F. and 80% RH test conditions.

Both ASTM D3985-81 and ASTM F1249-90 are incorporated hereinto in their entirety by reference thereto.

The PBC blend employed in the films of the invention can also contain a hydrocarbon resin, which serves as an extrusion aid. In addition, the presence of such resins frequently improves the barrier properties of the films and also the metal coating adhesion.

Hydrocarbon resins (also sometimes referred to as "hard resins") are relatively low molecular weight resinous materials, known in the art, derived from olefin monomers such as, inter alia, terpene monomers, coal tar fractions and petroleum fractions.

Suitable resins prepared from terpene monomers such as limonene and α- or β-pinene include Piccolyte resins from Hercules Incorporated, Wilmington, Del. and Zonotac resins from Arizona Chemical Company, Panama City, Fla.

Suitable resins prepared from hydrocarbon monomers and mixtures thereof include those based on 5 carbon monomers such as piperylene, cyclopentene, cyclopentadiene, oligomerized cyclopentadienes and isoprene monomers. Resins based on other hydrocarbon monomers include those based on petroleum fractions that are pure aromatics or mixtures of aromatics such as styrene, methyl styrene, α-methyl styrene, vinyl naphthalene and the indenes or methyl indenes. Particularly preferred are hydrogenated resins based on aromatic monomers, e.g., hydrogenated α-methyl styrene—vinyl toluene copolymers and hydrogenated cyclopentadiene resins.

Unhydrogenated or hydrogenated resins can be used, the only limitation being that the resin selected must be compatible with the PBC blend. If a specific resin is not suitably compatible with the PBC blend in the unhydrogenated state, its compatibility can usually be improved by hydrogenating it.

Commercially available hydrocarbon resins that can be employed in the films of the invention include Hercules Regalrez 1128 and Regalrez 1139 hydrogenated α-methyl styrene—vinyl toluene copolymer resins and Hercules Piccolyte C125 terpene resin. Also suitable is Escorez 5300 fully hydrogenated thermally oligomerized cyclopentadiene resin.

The hydrocarbon resin is present in the PBC blend mixture in an amount up to about 30% by weight of the PBC blend. More preferably, the resin is present in an amount of about 3 to 30%. Most preferably, the amount of the resin is about 7 to 15%.

PREPARATION OF FILMS USED IN THE EXAMPLES

The multilayer films of the Examples were prepared by coextrusion and biaxially oriented by the blown tube ("bubble") process or by the tenter process. Process procedures and parameters and proportions of components were as set forth in the respective examples.

Films prepared by the bubble process were coextruded through a trilayer extruder die head to form a core layer having a PBC or PBC blend layer on one of its surfaces and another functional layer on its other surface. The extruded, continuously moving tubular stalk was quenched to about 15 to 30° C., then passed through a first and second set of nip rolls and pinched flat. Between the two sets of nip rolls, the tube passed through a reheating zone and was reheated to a predetermined orientation temperature between about 130 and 150° C. At this temperature, the continuously moving tubular stalk was expanded with air into a large, thin bubble, resulting in 7X orientation in both the longitudinal and transverse directions, which, after heat setting to 10% relaxation, resulted in a thickness of about 0.55 mil.

Unless otherwise indicated, the polymer of the core layer was the highly isotactic polypropylene from Aristech Chemical Company. The composition of the PBC blend layer was as set forth in the various examples. The other functional layer was made of the same polypropylene as the core layer except that it contained, as an antiblocking agent, 0.08 pph of synthetic amorphous silica from W.R.Grace, Baltimore, Md.

Films prepared by the tenter process were coextruded through a three layer die head to form a core layer of the highly isotactic polypropylene having a layer of the PBC or PBC blend on one of its surfaces and a terpolymer of ethylene, propylene and butene-1 on the other surface to serve as a heat-sealable layer. The composite sheet was quenched by winding on a cooling drum held at about 20° C. The quenched sheet was reheated to about 125° C. by passing it over a series of heated rollers and drawn about 5X in the longitudinal direction, followed by transverse direction drawing about 10X in a tenter frame at about 160° C. The biaxially drawn film was heat set at about 160° C. while allowing about 10% relaxation. The resulting total film thickness prior to metallization was about 0.7 mil of which about 0.02 mil was the PBC or PBC blend layer and 0.06 mil was the heat-seal layer.

EXAMPLE 1

Using the tenter technique described above, a series of composite films were prepared comprised of a polypropylene core having a layer of a PBC (8% butene-1) on one surface thereof and the terpolymer sealant on the other surface.

The PBC surfaces of these films were subjected to either a corona or flame treatment. Corona treatment was effected to a level of about 2 Watt-minutes/ft$^2$ and the flame treatment to a level at which surface tension was increased to about 40 dynes.

Following the surface treatment, the films were metallized with aluminum by vacuum vapor deposition to an optical density of about 2.1 to 2.3. Optical density is defined as log(1/intensity of the transmitted light/intensity of the light source).

To simulate commercial films, the films were then provided, by lamination on the metal coated side, with a clear polypropylene slip film of 0.7 nil thickness, which contained about 0.1% by weight of an amide slip agent. The laminating agent was a melt extruded low density polyethylene applied at 8, 10 or 12 pounds per 3000 ft$^2$ at about 610° F. melt temperature. Before testing the bond strength, both sides of the laminate test strip were covered with a one inch wide strip of 3M Scotch Magic™ tape. Bond strength was measured as the average force required to peel a 1-inch wide strip of the adhesive and slip film, either with or without the metal coating, from the remainder of the multilayer film with an Instron™ Tensile Tester. The peel angle was kept constant at 90°. In general, a bond strength greater than about 90, measured by this test, exceeds the requirements for most present day commercial flexible film applications. However, bond strengths in excess of 90 still are preferred.

The metallized, laminated film samples were also tested for their water vapor and oxygen barrier properties using the ASTM tests cited hereinabove. WVTR was measured at 85° F. and 100% relative humidity and a correction factor of 0.8 was applied to this measurement to simulate the transmission rate at 80% relative humidity. WVTR measurements were made with a Permetran W instrument from Modern Controls, Incorporated, Minneapolis, Minn. OTR was measured at 23° C./dry gas using an Oxtran 100 instrument, also from Modern Controls Incorporated. Results of this testing are recorded in the following Table.

In Samples 1-a, 1-b and 1-c in Table 1, the core is 63.3 ga Fina 3371 homopolypropylene containing 15% reclaim, the bonding layer is 1.8 ga C$_3$C$_4$ copolymer containing about 8% butene-1 and the sealant layer is 4.9 ga C$_2$C$_3$C$_4$ terpolymer. In Sample 1-d, the components of the three layers are the same, but the thickness of the bonding layer is 1.3 ga, that of the core layer is 64.2 ga and that of the sealant layer is 4.5 ga. Sample 1-e is identical to Sample 1-a, 1-b and 1-c except that the core layer is Montell PH 384 homopolypropylene.

TABLE 1

| FILM SAMPLE | TREATMENT | BOND STRENGTH[1] | OTR[2] | WVTR[3] |
| --- | --- | --- | --- | --- |
| 1-a | CORONA | 200 | 1.5 | 0.005 |
| 1-b | FLAME | 375 | 1.5 | 0.004 |
| 1-c | FLAME | 370 | 1.5 | 0.004 |
| 1-d | FLAME | 301 | 0.8 | 0.004 |
| 1-e | FLAME | 223 | 1.2 | 0.003 |

[1]gms/in, average of 5 samples, aged 40° C./4 days
[2]cm$^3$/100 in$^2$/atm/day
[3]gm/100 in$^2$/day, at 85° F. and 80% R.H.

EXAMPLE 2

Using the tenter technique substantially as described hereinabove, a series of composite films were prepared wherein the barrier coating receiving layer was made up of a ternary mixture comprised of about 54% PBC, 30% homopolypropylene and 16% of an ethylene/propylene copolymer. The PBC was comprised of about 92% propylene and about 8% butene-1 and the ethylene/propylene copolymer was about 96% propylene and 4% ethylene. The surface of one of these films was subjected to a corona treatment of about 2 Watt-minutes/ft$^2$ on the PBC-coated surface, which raised the surface tension of the surface to about 45 dynes. The surface of another was subjected to a flame treatment to raise the surface tension to about 40 dynes. An aluminum coating was applied to the treated surface of the PBC layer by conventional vapor vacuum deposition. The films were laminated as above and tested for the same parameters as were tested in Example 1. Results are recorded in Table 2. As should be noted, the flame treated sample had a markedly higher bond strength than the corona treated sample, evidencing the significance of the flame treating operation in accordance with this invention. In fact, the very low bond strength achieved in sample 2-a suggests that the separation occurred by lift off of the metal coating, rather than separation of the polypropylene slip film from the metal coating.

TABLE 2

| FILM SAMPLE | TREATMENT | BOND STRENGTH | OTR | WVTR |
|---|---|---|---|---|
| 2-a | CORONA | 54 | 1.3 | 0.006 |
| 2-b | FLAME | 500 | 1.5 | 0.003 |

EXAMPLE 3

Using the tenter process substantially as described hereinabove, a series of three layer composite films, having the same layer thicknesses as the film of Example 2, were prepared comprised of a polypropylene core having a layer of a PBC blend on one surface and a layer containing a heat-sealable ethylene/propylene/butene-1 terpolymer on the other surface. In this case, the PBC blend contained, in addition to the polyolefin component, 7%, based on the weight of the PBC blend, of a commercially available hydrocarbon resin (Hercules Regalrez 1128).

These films were surface treated using corona and flame seriatim in tandem to a surface tension of 50 dynes. Following surface treatment, they were coated with aluminum by vacuum vapor deposition to an optical density of 2.1 to 2.3.

The OTR of these films prior to lamination was determined using the ASTM test method cited above. The films were then laminated with the protective film as in the previous examples and their laminar bond strength was determined. It was found that the aged laminar bond strength was undesirably low, even though the films exhibited good oxygen barrier properties.

TABLE 3

| FILM SAMPLE | PBC RATIO[4] | BOND STRENGTH | OTR |
|---|---|---|---|
| 3-a | 60/40 | 30 | 1.0 |
| 3-b | 70/30 | 30 | 0.8 |
| 3-c | 100/0 | 30 | 1.0 |

EXAMPLE 4

A film similar to that of Sample 3-c, but with the sealant layer replaced by a 0.03 mil layer of polypropylene containing 0.02% of an antiblock additive, was prepared by the bubble process. In this film the PBC blend layer was 100% PBC (8% butene-1) containing 11% hydrocarbon resin, based on the weight of the PBC. This film was corona treated to a level sufficient to raise the surface tension to about 38 to 40 dynes and was then aluminum coated as in Example 3. In this case, it was found that, in addition to having good barrier properties prior to laminating, the film also exhibited good interlaminar bonding after aging 4 days at room temperature and without tape backing. Results are recorded in Table 4 (film sample 4-a).

EXAMPLE 5

A three-layer composite film similar to that in Example 4 was prepared by the bubble process wherein the PBC blend layer was a 50/50 mixture of PBC (8% butene-1) and an ethylene/propylene copolymer containing about 6% ethylene.

This film was corona treated and coated with aluminum as described in the previous examples. Barrier properties of the unlaminated film and bond strength of the laminated film were determined as in Example 4 and are set forth in Table 4 (film sample 5-a).

EXAMPLE 6

Using the bubble process as described hereinabove, a trilayer film was prepared comprised of a 0.5 mil polypropylene core having a 0.03 mil PP layer containing an anti-block agent on one surface and a 0.02 mil layer of a 50/50 mixture of PP and PBC (8% butene-1) containing 5.5% of a hydrocarbon resin (based on the weight of the blend) on the other surface. The PP/PBC surface layer was corona treated to a about 38 to 40 dynes, then metallized with aluminum to an optical density between about 2.0 and 2.3.

The unlaminated film was tested for its OTR and its WVTR and, after lamination, for its interlaminar bond strength without aging or tape backing. Results are set forth in Table 4 (film sample 6-a).

TABLE 4

| FILM SAMPLE | PBC RATIO | BOND STRENGTH | OTR | WVTR |
|---|---|---|---|---|
| 4-a | 100/0 | 226 | 1.55 | 0.015 |
| 5-a | 50/50 | 137 | 0.81 | 0.02 |
| 6-a | 50/50 | 96 | 1.55 | 0.015 |

EXAMPLE 7

Using the bubble process substantially as described hereinabove, two trilayer films were prepared comprised of a 0.50 mil polypropylene core having a 0.03 mil PP layer containing an anti-blocking agent on one surface and a 0.02 mil layer of a PBC on the other surface. In one of these films (7a), the PBC contained 8% butene-1 and in the other, (7b), the PBC contained 14% butene-1. The films were corona treated to a level of 38 to 40 dynes and metallized with aluminum to an optical density of about 2.0 to 2.3. The barrier properties of the unlaminated films were determined. The films were laminated and their interlaminar bond strength was measured without aging or tape backing. Results of this testing are set forth in Table 5.

EXAMPLE 8

Again using the bubble process substantially as described hereinabove, two trilayer films were prepared comprised of a 0.50 mil polypropylene core having a 0.03 mil PP layer containing an anti-blocking agent on one surface and a 0.02 mil layer of a 60/40 polypropylene/PBC blend on the other surface. In one of these films (8a), the PBC contained 8% butene-1 and in the other (8b), the PBC contained 14% butene-1. The films were corona treated to a level of 38 to 40 dynes and metallized with aluminum to an optical density of about 2.0 to 2.3. The unlaminated coated films were tested for their OTR and WVTR and, after lamination, for their interlaminar bond strength, without aging or tape backing. Results of this testing are set forth in Table 5.

TABLE 5

| FILM SAMPLE | BOND STRENGTH | | OTR | WVTR |
|---|---|---|---|---|
| | 8# PE | 12# PE | | |
| 7-a | 243 | 245 | 2.51 | 0.015 |
| 7-b | 138 | 146 | 6.05 | 0.029 |
| 8-a | 122 | 97 | 1.37 | 0.013 |
| 8-b | 140 | 127 | 1.90 | 0.024 |

EXAMPLE 9

Using the tenter technique, films were prepared corresponding to Sample 1-b in Example 1 except that the PBC bonding layer is a mixture of a PBC containing about 8% butene-1 copolymer and a copolymer of ethylene and propylene containing about 3.5% ethylene. These films were flame treated to a level at which surface tension was increased to about 40 dynes, then coated with aluminum as in Example 1. OTR and MVTR were measured, also as in Example 1, and the results of these measurements are recorded in Table 6.

In Sample 9a, the metal receiving layer was a mixture of 51% of the PBC and 49% of the copolymer of ethylene and propylene; in sample 9b, it was a mixture of 60% of the PBC and 40% of the copolymer of ethylene and propylene. The control was the same homopolymer core with a pure 8% PBC metal coating receiving layer.

TABLE 6

| FILM SAMPLE | PBC RATIO | BOND STRENGTH | OTR | WVTR |
|---|---|---|---|---|
| 9-a | 51/49 | 250 | 1.40 | 0.005 |
| 9-b | 60/40 | 376 | 1.0 | 0.006 |
| Control | 100/0 | 250 | 1.30 | 0.005 |

While the invention has been described with respect to various specific embodiments thereof, it will be understood that it is not intended that the invention be limited to such specific embodiments. The invention is limited only as required by the following claims.

What is claimed is:

1. A biaxially oriented, heat-set, multilayer packaging film with excellent oxygen and moisture barrier properties, said film including a polyolefin core layer and at least one bonding layer, said at least one bonding layer having a surface adhered to said core layer and a flame treated surface opposite the surface adhered to said core layer, said flame treated surface having a surface tension of at least 38 dynes/cm, a metal coating for providing oxygen and moisture barrier properties deposited on said flame treated surface of said at least one bonding layer and a protective plastic film adhered to the exposed outer surface of said metal coating, said core layer and bonding layer either being free of void-creating additives or including only a quantity of such additives that does not create a matte surface adversely affecting the barrier properties of said metal coating, said bonding layer comprising a mixture including 40 to 100% by weight of propylene/butene-1 copolymer containing up to about 14% by weight of butene-1 (PBC), 0 to 60% of an isotactic polypropylene (PP) and 0 to 50% of a copolymer of ethylene and propylene wherein propylene is the predominant component by weight (EPC); said film being heat set to a level having sufficient dimensional stability toward heat so as not to adversely affect the oxygen and moisture barrier properties of said film.

2. The film of claim 1, wherein the polyolefin is polypropylene.

3. The film according to claim 1, wherein the bonding layer mixture is comprised of about 50 to 100% by weight of a propylene/butene-1 copolymer containing up to about 14% butene-1, 0 to 50% by weight of isotactic polypropylene and 0 to 50% by weight of a copolymer of ethylene and propylene.

4. The film according to claim 3, wherein the bonding layer mixture is comprised of about 50 to 90% by weight of a propylene/butene-1 copolymer containing up to about 14% butene-1, 9 to 49% by weight of isotactic polypropylene and 1 to 20% by weight of a copolymer of ethylene and propylene.

5. The film according to claim 3, wherein the copolymer of ethylene and propylene in the bonding layer is about 0–20% by weight of said bonding layer.

6. The film according to claim 1, wherein the barrier metal coating is aluminum.

7. The film according to claim 3, wherein the barrier metal coating is aluminum.

8. The film according to claim 4, wherein the barrier metal coating is aluminum.

9. The film according to claim 1, said propylene/butene-1 copolymer containing up to about 8% by weight of butene-1.

10. The film according to claim 3, said propylene/butene-1 copolymer containing up to about 8% by weight of butene-1.

\* \* \* \* \*